United States Patent
Beck et al.

(10) Patent No.: US 6,616,712 B1
(45) Date of Patent: Sep. 9, 2003

(54) USE OF COMPOSITIONS CONTAINING BISAZO COMPOUNDS FOR DETECTING FISSURES

(75) Inventors: Karin Heidrun Beck, Ludwigshafen (DE); Christos Vamvakaris, Kallstadt (DE); Karl-Heinz Etzbach, Frankenthal (DE); Gerhard Scholz, Hochdorf-Assenheim (DE); Claudia Kräh, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/850,734

(22) PCT Filed: Nov. 20, 1999

(86) PCT No.: PCT/EP99/08917

§ 371 (c)(1),
(2), (4) Date: May 17, 2001

(87) PCT Pub. No.: WO00/31188

PCT Pub. Date: Jun. 2, 2000

(30) Foreign Application Priority Data

Nov. 26, 1998 (DE) .......................... 198 54 677

(51) Int. Cl.⁷ .................. C09B 62/006; C09B 62/01

(52) U.S. Cl. .................... 8/639; 8/466; 8/662

(58) Field of Search .............. 8/639, 662, 466

(56) References Cited

U.S. PATENT DOCUMENTS

| 4,000,985 A | * | 1/1977 | Orelup | 44/59 |
| 4,191,048 A | * | 3/1980 | Molina | 73/104 |
| 5,676,708 A |   | 10/1997 | Smith | 8/521 |

FOREIGN PATENT DOCUMENTS

| DE | 23 61 758 | 6/1975 |
| DE | 24 13 369 | 10/1975 |
| DE | 35 07 174 | 9/1986 |

* cited by examiner

Primary Examiner—Mark Kopec
Assistant Examiner—Eisa Elhilo
(74) Attorney, Agent, or Firm—Oblon, Spivak, McClelland, Maier & Neustadt, P.C.

(57) ABSTRACT

Compositions comprising as components

A) at least one bisazo compound selected from the group consisting of the compounds of the general formula Ia

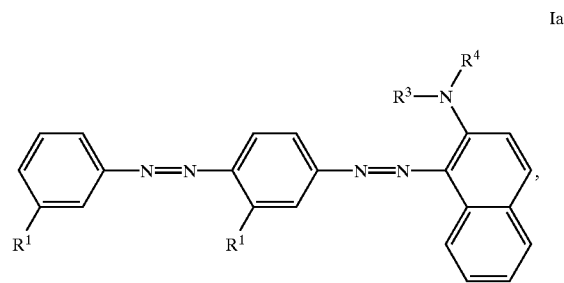

and of the general formula Ib

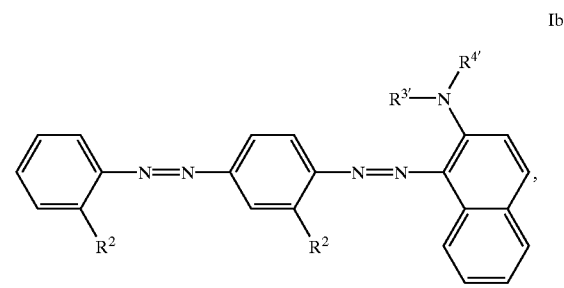

where $R^1$ is $C_1$–$C_8$-alkyl, $R^2$ is $C_2$–$C_8$-alkyl, $R^3$ and $R^{3'}$ are each $C_2$–$C_{21}$-alkyl in which up to four $CH_2$ groups of the carbon chain may be replaced by oxygen in ether function, $R^4$ is hydrogen or is $R^3$ (independently of $R^3$), $R^{4'}$ is hydrogen or is $R^{3'}$ (independently of $R^{3'}$), B) at least one solvent in which said component A) is soluble, and optionally C) at least one surface-active substance, are useful as dye penetrants for detecting surface cracks or other defects in workpieces to be tested in this respect.

12 Claims, No Drawings

USE OF COMPOSITIONS CONTAINING BISAZO COMPOUNDS FOR DETECTING FISSURES

The present invention relates to the use of compositions comprising as components A) at least one bisazo compound selected from the group consisting of the compounds of the formula Ia

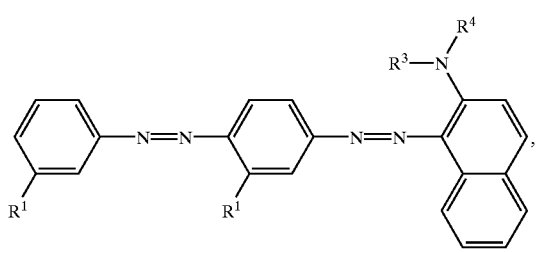

Ia and of the general formula Ib

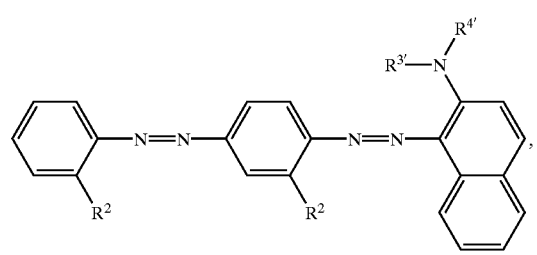

Ib where
$R^1$ is $C_1-C_8$-alkyl,
$R^2$ is $C_2-C_8$-alkyl,
$R^3$ and $R^{3'}$ are each $C_2-C_{21}$-alkyl in which up to four $CH_2$ groups of the carbon chain may be replaced by oxygen in ether function,
$R^4$ is hydrogen or is $R^3$ (independently of $R^3$),
$R^{4'}$ is hydrogen or is $R^{3'}$ (independently of $R^{3'}$), B) at least one solvent in which said component A) is soluble, and optionally C) at least one surface-active substance, as dye penetrants for detecting surface cracks or other defects in workpieces to be tested in this respect.

The present invention further relates to compositions comprising the abovementioned components A), B) and C).

U.S. Pat. No. 4,191,048 describes a method for detecting cracks and other defects in workpieces. The cracks are detected using a composition comprising a solution of an isomer mixture of a red, daylight visible bisazo dye and a surfactant that is miscible with said solution. This isomer mixture of the red bisazo dye is derived from (randomly) methyl-substituted aminoazobenzene (as starting material for the diazo component) and a $C_5-C_{12}$-alkyl-β-naphthol or mixtures of such $C_5-C_{12}$-alkyl-β-naphthols (as coupling component).

This dye (or, to be more precise, the isomer mixture of this dye) does indeed provide clear indications of cracks in the test workpiece, but there is a disadvantage in that toxicologically suspect, isomeric bisazo compounds are present.

German Offenlegungsschrift DE-A 35 07 174 describes a process for documenting crack tests on workpieces by means of dyes or dye intermediates which transfer out of the cracks of the workpiece onto a sheetlike substrate with which the workpiece is contacted. The preferred substrate in question is said to be paper, optionally provided with a receiver layer.

Suitable dyes are said to be Solvent Yellow 56 (C.I. 11021), Solvent Yellow 14 (C.I. 12055), Disperse Red 1 (C.I 11110), Disperse Blue 3 (C.I. 61505) and Solvent Orange 3 (C.I 11270).

The aforementioned oil-soluble yellow and orange ("solvent") dyes, being light-colored, generally provide an insufficient contrast to the color of the workpiece, while the aforementioned "disperse" dyes are in turn insufficiently soluble in the solvent of the dye penetrant, so that an insufficient contrast to the color of the workpiece results because of the insufficient dye concentration.

It is an object of the present invention to provide a dye penetrant composition which provides a high contrast indication of cracks and voids and whose dye(s) is or are not based on amines of class III A 2, as defined in TRGS (German technical regulations for hazardous materials) 614.

We have found that this object is achieved by the use of the initially described compositions as dye penetrants for detecting surface cracks or other surface defects in workpieces to be tested in this respect.

Suitable $C_2-C_8$-alkyl for $R^2$ includes not only unbranched alkyl chains, e.g., ethyl, n-propyl, isopropyl, n-butyl, sec-butyl, n-pentyl, pent-2-yl, pent-3-yl, n-hexyl, hex-2-yl, hex-3-yl, n-heptyl, hept-2-yl, hept-3-yl, hept-4-yl, n-octyl, oct-2-yl, oct-3-yl and oct-4-yl, but also branched alkyl chains, e.g., isobutyl, tert-butyl, 2-methylbutyl, 3-methylbutyl, 2,2-dimethylpropyl, 1,1-dimethylpropyl, 1,2-dimethylpropyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-trimethylpropyl, 1-ethyl-1-methylpropyl, 1-ethyl-2-methylpropyl and 2-ethylhexyl.

Suitable $C_1-C_8$-alkyl for $R^1$ includes methyl in addition to the aforementioned radicals.

Suitable $C_2-C_{21}$-alkyl for $R^3$ and $R^4$ and for $R^{3'}$ and $R^{4'}$, in addition to the branched or unbranched $C_2-C_8$-alkyl radicals already mentioned as examples under $R^2$, includes in each case independently not only unbranched $C_9-C_{21}$-alkyl, e.g., n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl or n-heneicosyl, and the corresponding radicals which are isomeric in respect of their point of attachment (yl position), but also the corresponding branched $C_9-C_{21}$-alkyl radicals.

Examples of $C_2-C_{21}$-alkyl in which up to four $CH_2$ groups of the carbon chain may be replaced by oxygen in ether function for $R^3$ and $R^4$ and for $R^{3'}$ and $R^{4'}$ are 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl, 3,6,9,12-tetraoxatetradecyl.

Further suitable such radicals are oligopropylene glycol groupings which are derived through addition of one, two, three or four propylene oxide molecules per amino group of the naphthylamine, and also their methyl or ethyl ethers.

Such radicals conform for example to the formulae
—(O—CH$_2$—CH$_2$(CH$_3$)—)$_n$—OR or —(O—CH$_2$(CH$_3$)—

$CH_2$—$)_n$—OR, where n is 1, 2, 3 or 4 and R is hydrogen, methyl or ethyl.

Preference is given to using compositions in which $R^1$ and $R^2$ are each respectively $C_1$–$C_4$-alkyl and $C_2$–$C_4$-alkyl as included in the examples recited above.

$C_2$–$C_{21}$-Alkyl for $R^4$ and/or $R^3$ and for $R^{4'}$ and/or $R^{3'}$ is in particular 2-ethylhexyl and branched or unbranched tridecyl.

Particular preference is given to using compositions in which said component A) comprises at least one bisazo compound of the formula Ia. The hereinbefore mentioned preferences also concern the particularly preferred composition mentioned herein.

The bisazo compounds of the formulae Ia and Ib are customarily prepared in two reaction steps. Azo coupling the diazo compound obtained from meta-$R^1$-aminobenzene (($K_1$)) or ortho-$R^2$-aminobenzene (($K_2$)) with a further molecule of the corresponding amine gives the substituted azobenzene ("di-($K_1$)" or "di-($K_2$)") in the first step. This substituted azobenzene is in turn diazotized and reacted in the second step with a molecule of the $R^3$,$R^4$- or $R^{3'}$,$R^{4'}$-(di)substituted naphthylamine (coupling component ($K_3$) or ($K_{3'}$)) to form the corresponding target compound of the formula Ia or Ib. The reaction scheme hereinbelow illustrates this once more by way of example for the preparation of bisazo compounds of the formula Ia.

radicals, i.e., the amine components ($K_1$) and ($K_2$) are generally pure compounds.

However, the radicals $R^3$ and/or $R^4$ or $R^{3'}$ and/or $R^{4'}$ of the coupling component ($K_3$) (or ($K_{3'}$), respectively), are frequently mixtures of a plurality of isomeric alkyl radicals, especially in the case of higher alkyl radicals in which up to four $CH_2$ groups of the carbon chain may be replaced by oxygen in ether function, so that the (di)substituted naphthylamines ($K_3$) and ($K_{3'}$) are in a given case representative of isomer mixtures with regard to these radicals.

This is usually attributable to the synthesis of such (di)substituted naphthylamines, since these are customarily prepared starting from naphthylamine and reactants which contain isomer mixtures of such alkyl radicals. Such reactants are generally isomer mixtures of alkyl halides or else of epoxides.

In this sense, the formulae Ia and Ib are in a given case also representative of isomer mixtures of bisazo compounds with regard to the radicals $R^3$ and/or $R^4$ and the radicals $R^{3'}$ and/or $R^{4'}$, respectively.

Furthermore, the hereinabove recited amine components ($K_1$) and ($K_2$) and the bisazo compounds to be used according to this invention do not come within TRGS 614 and are therefore not subject to the use restrictions mentioned therein either. This aspect was discussed earlier.

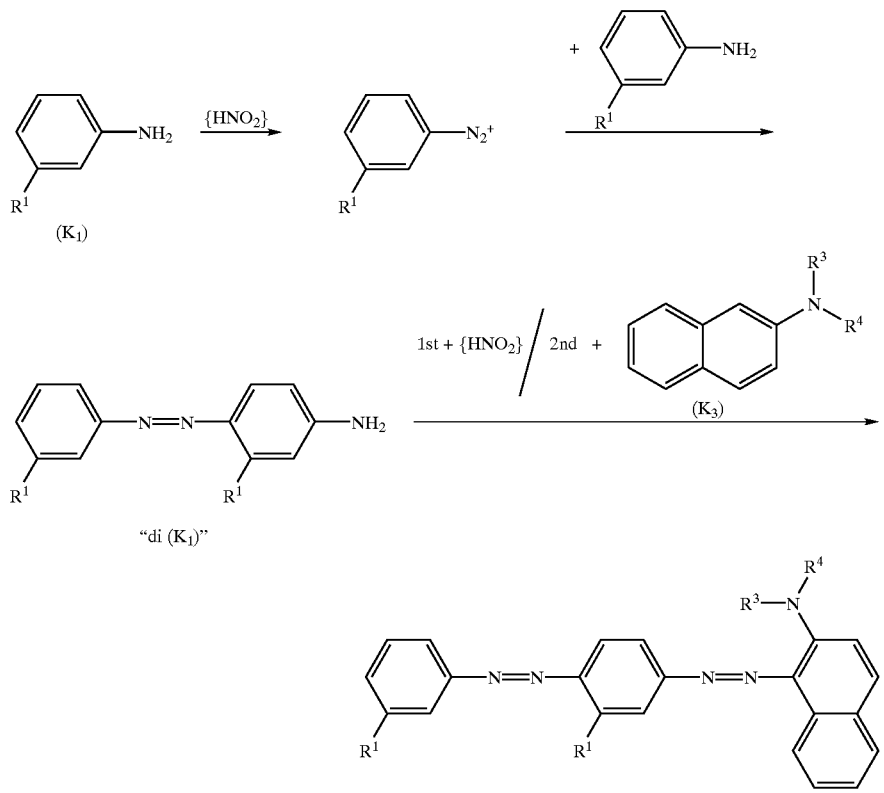

This scheme holds very similarly, mutatis mutandis, for the preparation of the compounds of the formula Ib.

The preparation of such compounds to be used according to this invention is effected for example along the lines of the directions in German Auslegeschrift DE 24 13 369 B2 and German Offenlegungsschrift DT 23 61 758 A1 and therefore does not present a problem to one skilled in the art.

The alkyl radicals $R^1$ and $R^2$ of the aromatic amine components ($K_1$) and ($K_2$), respectively, are usually defined Suitable solvents (component B)) for component A) are:
$C_1$–$C_4$-alcohols, e.g., methanol, ethanol, n-propanol, isopropanol, butanol, isobutanol, sec-butanol, and also especially the $C_5$–$C_{12}$-alcohols n-pentanol, n-hexanol, n-heptanol, n-octanol, n-nonanol, n-decanol, n-undecanol and n-dodecanol and their isomers,
glycols, e.g., 1,2-ethylene glycol, 1,2- or 1,3-propylene glycol, 1,2-, 2,3- or 1,4-butylene glycol, di- or triethylene glycol or di- or tripropylene glycol, ethers, e.g., methyl tert-butyl ether, 1,2-ethylene glycol mono- or dimethyl ether, 1,2-ethylene glycol mono- or diethyl ether, 3-methoxypropanol, 3-isopropoxypropanol, tetrahydrofuran or dioxane, ketones, e.g., acetone, methyl ethyl ketone, methyl isobutyl ketone or diacetone alcohol (4-hydroxy-4-methyl-2-pentanone), $C_1$–$C_5$-alkyl esters, e.g., methyl acetate, ethyl acetate, propyl acetate, butyl acetate or amyl acetate, aliphatic or aromatic hydrocarbons such as, for example, pentane, hexane, heptane, octane, isooctane, petroleum ether, toluene, xylene, ethylbenzene, tetralin, decalin, dimethylnaphthalene, universal spirits, Shellsol® or Solvesso® mineral oils, for example gasoline, kerosene, diesel oil or fuel oil, but also natural oils, for example olive oil, soybean oil, rapeseed oil or sunflower oil.

It will be appreciated that it is also possible to use mixtures of these solvents as component B).

The dye penetrant compositions of the invention may further comprise surface-active substances (component C)).

These substances may be not only cationic, anionic, nonionic but also zwitterionic compounds or mixtures thereof.

Examples of possible additives are (without the order of the recitation which follows being intended to imply an assignment to one of these classes) polycarboxylates and copolymers marketed as Sokalan® or Elvacite®, or else "hyperdispersants" marketed under the name of Solsperse®, also formaldehyde condensates based on aromatic sulfonates or alkylaromatic sulfonates available under the brand names Tamol® and Nekal® and also Supragil® and Rhodacar®.

It is further possible to use for example:

alkoxylation products which are based on aliphatic or alkylaromatic hydroxy; amino and aminohydroxy compounds and are commercially available under the brand names of Synperonic® and Ukanil®, Dehypon®, Neopol® ethoxylates, Emulan®, Lutensol®, Plurafac® and Pluronic® or Elfapur®, polyalkylene glycols known under the brand names of Pluriol® and Antarox® and alkyl ethers thereof, aliphatic and alkylaromatic mono- and polysulfonates bearing the brand names of Lutensit®, Rhodacar®, Rhodapon® and Teepol®, acid esters and amides such as, for example, sulfosuccinic esters of the Elfanol® brand, partial phosphoric esters marketed under the name of Rhodafac® or else Marlophor®, fatty acid partial glycerides and also fatty acid alkanolamides available under the brand names of Luwitor® and Marlamid®, and also the surfactants available under the names of Plantaren® and Glucopon®.

It is further possible to use surface-active substances having betain or sultain groups and which are inner salts of quaternary ammonium and carboxylate (betaine) or sulfonate (sultaine) ions and are available for example under the brand name of Mackam®. It is further possible to use cationic surface-active substances based on quaternary ammonium compounds and amine oxides as are available for example under the names of Alkaquat® and Rhodaquat® and also Mackalene®, Mackernium®, Mackpro® and Mackamine®.

When the addition of surface-active substances (component C)) to the compositions is desired, it is preferable to add nonionic or anionic surfactants. Suitable are in particular alkoxylation products based on aliphatic or alkylaromatic hydroxy, amino and aminohydroxy compounds, polyalkylene glycols and their alkyl ethers and also formaldehyde condensates based on aromatic sulfonates or alkylaromatic sulfonates.

The present invention further provides compositions comprising as components

A) at least one bisazo compound selected from the group consisting of the mentioned compounds of the formulae Ia and Ib at the outset, B) at least one solvent in which said component A) is soluble, and C) at least one surface-active substance.

These compositions preferably comprise bisazo compounds of the formulae Ia and Ib where $R^1$ is $C_1$–$C_4$-alkyl and $R^2$ is $C_2$–$C_4$-alkyl. These preferred alkyl radicals were exemplified hereinabove.

Particular preference is given to compositions in which said component A) comprises at least one bisazo compound of the formula Ia. The hereinbefore mentioned preferences also concern the particularly preferred composition mentioned herein.

Examples of solvents (component B)) in the compositions of the invention were exemplified hereinabove.

Examples of surface-active substances (component C)) in the compositions of the invention were likewise exemplified hereinabove.

Preference is given to compositions in which said component C) comprises at least one nonionic or anionic surface-active substance. More particularly, the nonionic surface-active substances are alkoxylation products which are based on aliphatic or alkylaromatic hydroxy, amino and aminohydroxy compounds and are available under the brand names of Synperonic® and Ukanil®, Dehypon®, Neopol® ethoxylates, Emulan®, Lutensol®, Plurafac® and Pluronic® or Elfapur®, polyalkylene glycols and alkyl ethers thereof known under the brand names of Pluriol® and Antarox®, acid esters and amides such as, for example, sulfosuccinic esters of the Elfanol® brand, fatty acid partial glycerides and also fatty acid alkanolamides available under the brand names of Luwitor® and Marlamid®, and also the products available under the names of Plantaren® and Glucopon®.

The anionic surface-active substances are in particular formaldehyde condensates based on aromatic sulfonates or are alkylaromatic sulfonates available under the brand names of Tamol® and Nekal® and also Supragil® and Rhodacar®.

The hereinabove described preferences with regard to the bisazo compounds and their preferred substituents also apply to such preferred compositions (comprising nonionic or anionic surface-active substances).

Particular preference is given to compositions and their preferred embodiments in which said component C) comprises the alkoxylation product, or a mixture of alkoxylation products, of aliphatic or alkylaromatic hydroxy, amino or hydroxyamino compounds.

These alkoxylation products are customarily based on ethylene oxide, propylene oxide or mixtures of these alkylene oxides as alkoxylating agents. The aliphatic or alkylaromatic hydroxy, amino or hydroxyamino compounds form the "head unit" whose hydroxy, amino or hydroxyamino functionalities are the starting point for the oligomerization/polymerization ("tail") of the ethylene oxide, propylene oxide or mixtures of these alkylene oxides. In addition, free hydroxyl groups can be etherified with alkyl groups.

The "head units" are customarily fatty alcohols (linear, saturated or unsaturated primary $C_6$–$C_{22}$-alcohols), oligosaccharides, alkylphenols, fatty amines (linear, saturated or unsaturated usually primary $C_6$–$C_{22}$-amines) and also low molecular weight addition products of single or multiple amines and alkylene oxides (hydroxyamines).

Examples of suitable fatty alcohol and alkylphenol alkoxylates are the products commercially available under the brand names of Lutensol®, Plurafac® and Pluronic®. Express reference may further be made to the nonionic surface-active substances of comparable chemistry which are disclosed in said U.S. Pat. No. 4,191,048 in the passage starting at column 4 line 52 and ending at column 8 line 30 and which shall be deemed incorporated herein by reference.

Particular preference is also given to compositions and their preferred embodiments wherein said component C) comprises a polyalkylene glycol, a polyalkylene glycol alkyl ether or a mixture of polyalkylene glycols or/and polyalkylene glycol alkyl ethers between or with each or one another.

Examples are the polyalkylene glycols commercially available under the brand names of Pluriol® and Antarox®.

The compositions to be used according to the present invention include component A) in a fraction of from 0.10 to 25.0% by weight, preferably in a fraction of from 1.0 to 10.0% by weight, and accordingly component B) in a fraction of from 75.0 to 99.90% by weight, preferably in a fraction of from 90.0 to 99.0% by weight, based on the total amount of component A) and component B).

A component C) will be present in a fraction of from 1.0 to 15.0% by weight, preferably from 2.0 to 5.0% by weight, of the total amount of components A), B) and C). The total amount of components A) and B) adds up to 100% by weight and is accordingly within the range from 85.0 to 99.0% by weight, preferably within the range from 98.0 to 95.0% by weight. The ratio of component A) to component B) is derived from the statements provided hereinabove.

Component C) is present in the compositions of the invention in a fraction of from 1.0 to 15.0% by weight, preferably from 2.0 to 5.0% by weight, based on the total amount of components A), B) and C). The total amount of components A) and B) adds up to 100% by weight and is accordingly within the range from 85.0 to 99.0% by weight, preferably within the range from 98.0 to 95.0% by weight. The ratio of components A) and B) to each other again follows from the statements made hereinabove.

The procedures involved in applying dye penetrant compositions are known to those skilled in the art and are extensively described for example in DIN 54 152, German Offenlegungsschrift DE-A 35 07 174 and U.S. Pat. No. 4,191,048, so that this does not have to be discussed here any further.

EXAMPLES

Dyes

The following dyes were synthesized according to customary methods:

| Dye | Structure |
|---|---|
| 1 | (structure) |
| 2 | (structure, i-Tridecyl) |
| 3 | (structure) |
| 4 | (structure, i-Tridecyl) |

In the dyes of Examples 2 and 4, "i-Tridecyl" is to be understood as meaning a mixture of the isomeric $C_{13}H_{27}$ radicals.

EXAMPLES

Compositions

The table which follows provides examples of very useful dye penetrant compositions. They are obtained by mixing the individual components. The percentages are by weight. Shellsol® AB is a high boiling aromatic mixture commercially available from Shell.

| Example | Composition |
|---|---|
| 1 | 3% of Dye 1 |
| | 97% of Shellsol ® AB |
| 2 | 15% of dye 1 |
| | 85% of Shellsol ® AB |
| 3 | 1% of dye 1 |
| | 99% of xylene |
| 4 | 5% of dye 1 |
| | 95% of toluene |
| 5 | 2% of dye 1 |
| | 98% of universal spirits |
| 6 | 1% of dye 1 |
| | 99% of heptane |
| 7 | 2.5% of dye 1 |
| | 97.5% of diesel oil |
| 8 | 2.5% of dye 1 |
| | 97.5% of fuel oil |
| 9 | 0.1% of dye 1 |
| | 99.9% of ethyl acetate |
| 10 | 1.5% of dye 1 |
| | 98.5% of butanol |
| 11 | 1.5% of dye 1 |
| | 98.5% of pentanol |
| 12 | 1% of dye 1 |
| | 99% of 1,2-ethylene glycol |
| 13 | 1% of dye 1 |
| | 99% of 1,2-propylene glycol |
| 14 | 1% of dye 1 |
| | 99% of acetone |
| 15 | 3% of dye 1 |
| | 15% of Shellsol ® AB |
| | 82% of ethyl acetate |
| 16 | 3% of dye 1 |
| | 15% of Shellsol ® AB |
| | 82% of 1,2-propylene glycol |
| 17 | 3% of dye 1 |
| | 15% of Shellsol ® AB |
| | 82% of acetone |
| 18 | 5% of dye 1 |
| | 90% of Shellsol ® AB |
| | 5% of Tamol ® NLP |
| 19 | 8% of dye 1 |
| | 90% of Shellsol ® AB |
| | 2% of Emulan ® A |
| 20 | 10% of dye |
| | 85% of Shellsol ® AB |
| | 5% of Nekal ® BX |
| 21 | 3% of dye 1 |
| | 15% of Shellsol ® AB |
| | 80% of 1,2-propylene glycol |
| | 2% of Nekal ® BX |
| 22 | 3% of dye 1 |
| | 15% of Shellsol ® AB |
| | 80% of acetone |
| | 2% of Nekal ® BX |
| 23 | 1% of dye 2 |
| | 99% of xylene |
| 24 | 5% of dye 2 |
| | 95% of xylene |
| 25 | 15% of dye 2 |
| | 85% of xylene |
| 26 | 25% of dye 2 |
| | 75% of xylene |
| 27 | 5% of dye 2 |
| | 95% of Shellsol ® AB |
| 28 | 5% of dye 2 |
| | 93% of Shellsol ® AB |
| | 2% of Nekal ® BX |
| 29 | 5% of dye 2 |
| | 93% of ethyl acetate |
| | 2% of Nekal ® BX |
| 30 | 5% of dye 2 |
| | 28% of Shellsol ® AB |
| | 65% of ethyl acetate |
| | 2% of Nekal ® BX |
| 31 | 1% of dye 3 |
| | 99% of Shellsol ® AB |
| 32 | 2% of dye 3 |
| | 98% of Shellsol ® AB |
| 33 | 5% of dye 3 |
| | 95% of Shellsol ® AB |
| 34 | 5% of dye 3 |
| | 93% of Shellsol ® AB |
| | 2% of Nekal ® BX |
| 35 | 5% of dye 3 |
| | 28% of Shellsol ® AB |
| | 65% of ethyl acetate |
| | 2% of Nekal ® BX |
| 36 | 1% of dye 4 |
| | 99% of Shellsol ® AB |
| 37 | 2% of dye 4 |
| | 98% of Shellsol ® AB |
| 38 | 5% of dye 4 |
| | 95% of Shellsol ® AB |
| 39 | 5% of dye 3 |
| | 93% of Shellsol ® AB |
| | 2% of Nekal ® BX |
| 40 | 5% of dye 3 |
| | 28% of Shellsol ® AB |
| | 65% of ethyl acetate |
| | 2% of Nekal ® BX |
| 41 | 1% of dye 1 |
| | 1% of dye 2 |
| | 98% of xylene |
| 42 | 3% of dye 1 |
| | 1% of dye 2 |
| | 96% of xylene |
| 43 | 3% of dye 1 |
| | 1% of dye 2 |
| | 96% of Shellsol ® AB |
| 44 | 2.5% of dye 1 |
| | 2.5% of dye 2 |
| | 28% of Shellsol ® AB |
| | 65% of ethyl acetate |
| | 2% of Nekal ® BX |
| 45 | 2.5% of dye 1 |
| | 2.5% of dye 2 |
| | 28% of Shellsol ® AB |
| | 67% of 1,2-propylene glycol |
| 46 | 2.5% of dye 1 |
| | 2.5% of dye 2 |
| | 28% of Shellsol ® AB |
| | 65% of 1,2-propylene glycol |
| | 2% of Nekal ® BX |
| 47 | 1% of dye 3 |
| | 1% of dye 4 |
| | 98% of xylene |
| 48 | 3% of dye 3 |
| | 1% of dye 4 |
| | 96% of xylene |
| 49 | 3% of dye 3 |
| | 1% of dye 4 |
| | 96% of Shellsol ® AB |
| 50 | 2.5% of dye 3 |
| | 2.5% of dye 4 |
| | 28% of Shellsol ® AB |
| | 65% of ethyl acetate |
| | 2% of Nekal ® BX |
| 51 | 2.5% of dye 3 |
| | 2.5% of dye 4 |
| | 28% of Shellsol ® AB |
| | 67% of 1,2-propylene glycol |
| 52 | 2.5% of dye 3 |
| | 2.5% of dye 4 |
| | 28% of Shellsol ® AB |
| | 65% of 1,2-propylene glycol |
| | 2% of Nekal ® BX |
| 53 | 1% of dye 1 |
| | 1% of dye 2 |
| | 1% of dye 3 |
| | 1% of dye 4 |
| | 96% of Shellsol ® AB |
| 54 | 1% of dye 1 |
| | 1% of dye 2 |

| Example | Composition |
|---------|-------------|
|         | 1% of dye 3 |
|         | 1% of dye 4 |
|         | 36% of Shellsol ® AB |
|         | 60% of ethyl acetate |
| 55      | 1% of dye 1 |
|         | 1% of dye 2 |
|         | 1% of dye 3 |
|         | 1% of dye 4 |
|         | 36% of Shellsol ® AB |
|         | 60% of 1,2-propylene glycol |
| 56      | 1% of dye 1 |
|         | 1% of dye 2 |
|         | 1% of dye 3 |
|         | 1% of dye 4 |
|         | 36% of Shellsol ® AB |
|         | 58% of 1,2-propylene glycol |
|         | 2% of Nekal ® BX |

We claim:

1. A method of using compositions comprising as components
   A) at least one bisazo compound selected from the group consisting of the compounds of the general formula Ia Ia
   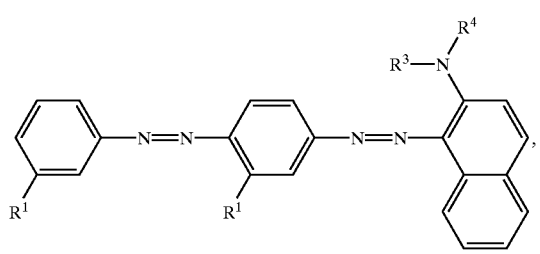

and of the general formula Ib

Ib
   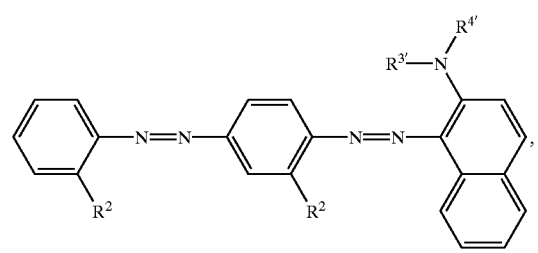

where
   $R^1$ is $C-C_8$-alkyl,
   $R^2$ is $C_2-C_8$-alkyl,
   $R^3$ and $R^{3'}$ are each $C_2-C_{21}$-alkyl in which up to four $CH_2$ groups of the carbon chain may be replaced by oxygen in ether function,
   $R^4$ is independently of $R^3$ hydrogen or $C_2-C_{21}$-alkyl in which up to four $CH_2$ groups of the carbon chain may be replaced by oxygen in ether function,
   $R^{4'}$ is independently of $R^{3'}$ hydrogen or $C_2-C_{21}$-alkyl in which up to four $CH_2$ groups of the carbon chain may be replaced by oxygen in ether function, and
   B) at least one solvent in which said component A) is soluble; as dye penetrants for detecting surface cracks or other defects in workpieces to be tested in this respect.

2. A method as claimed in claim 1, wherein $R^1$ is $C_1-C_4$-alkyl in the bisazo compounds of the formulae Ia and $R^2$ is $C_2-C_4$-alkyl in the bisazo compounds of the formulae Ib.

3. A method as claimed in claim 1, wherein said component A) comprises at least on bisazo compound of the formula Ia.

4. A composition comprising
   A) at least one bisazo compound selected from the group consisting of the compounds of the formulae Ia and Ib Ia
   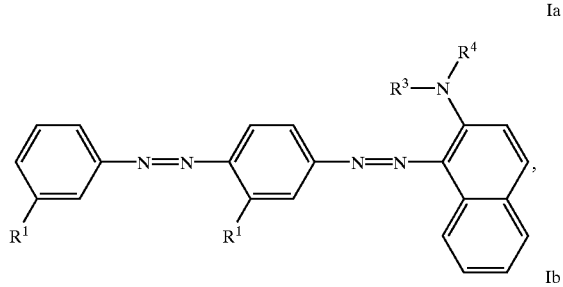

Ib
   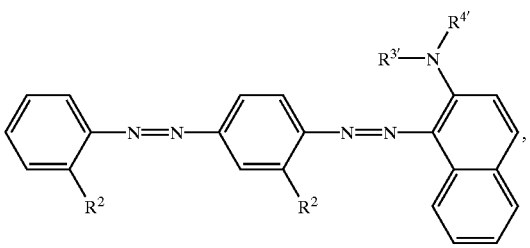

where
   $R^1$ is $C_1-C_8$-alkyl,
   $R^2$ is $C_2-C_8$-alkyl,
   $R^3$ and $R^{3'}$ are each $C_2-C_{21}$-alkyl in which up to four $CH_2$ groups of the carbon chain may be replaced by oxygen in ether function,
   $R^4$ is independently of $R^3$ hydrogen or $R^3$,
   $R^{4'}$ is independently of $R^{3'}$ hydrogen or $R^{3'}$,
   B) at least one solvent in which said component A) is soluble, and
   C) at least one surface-active substance.

5. The composition as claimed in claim 4, wherein $R^1$ is $C_1-C_4$-alkyl in the bisazo compounds of the formula Ia and $R^2$ is $C_2-C_4$- alkyl in the bisazon compound of the formula Ib.

6. The composition as claimed in claim 4, wherein said component A) comprises at least one bisazo compound of the formula Ia.

7. The composition as claimed in claim 4, wherein said component C) comprises at least one nonionic or anionic surface-active substance.

8. The composition as claimed in claim 4, wherein said component C) comprises the alkoxylation product, or a mixture of alkoxylation products, of aliphatic or alkylaromatic hydroxy, amino or aminohydroxy compounds.

9. The composition as claimed in claim 4, wherein said component C) comprises a polyalkylene glycol, a polyalkylene glycol alkyl ether or a mixture of polyalkylene glycols or/and polyalkylene glycol alkyl ethers between or with each or one another.

10. The method as claimed in claim 1, which further comprises at least one surface-active substance.

11. The method as claimed in claim 10, wherein the at least one surface-active substance is at least one nonionic or anionic surface-active substance.

12. The method as claimed in claim 10, wherein the at least one surface-active substance comprises the alkoxylation product, or a mixture of alkoxylation products, of aliphatic or alkylaromatic hydroxy, amino or aminohydroxy compounds.

* * * * *